United States Patent
Pederson et al.

(10) Patent No.: US 8,452,730 B2
(45) Date of Patent: May 28, 2013

(54) ARCHIVING METHOD AND SYSTEM

(75) Inventors: May Pederson, San Diego, CA (US);
James Chapman, Glendale, CA (US);
Cuong Nhan, Oceanside, CA (US);
Jeremy Davis, San Diego, CA (US);
Donald Pederson, San Diego, CA (US);
James Pierce, Torrance, CA (US);
Sunanda Reddy, Dublin, CA (US);
Stephen Sheldon, Seattle, WA (US)

(73) Assignee: Teradata US, Inc., Dayton, OH (US)

( * ) Notice: Subject to any disclaimer, the term of this patent is extended or adjusted under 35 U.S.C. 154(b) by 453 days.

(21) Appl. No.: 12/329,681

(22) Filed: Dec. 8, 2008

(65) Prior Publication Data

US 2009/0157775 A1    Jun. 18, 2009

Related U.S. Application Data

(60) Provisional application No. 61/012,959, filed on Dec. 12, 2007.

(51) Int. Cl.
*G06F 7/00* (2006.01)
*G06F 17/00* (2006.01)

(52) U.S. Cl.
USPC ........... 707/648; 707/640; 707/647; 707/650; 707/653

(58) Field of Classification Search
CPC .................................... G06F 17/00; G06F 7/00
USPC ......... 707/609, 660–664, 705, 665, 667–674, 707/620, 640–654; 711/161–162
See application file for complete search history.

(56) References Cited

U.S. PATENT DOCUMENTS

| | | | | |
|---|---|---|---|---|
| 5,278,982 A | * | 1/1994 | Daniels et al. | 1/1 |
| 5,638,508 A | * | 6/1997 | Kanai et al. | 714/20 |
| 6,073,128 A | * | 6/2000 | Pongracz et al. | 707/640 |
| 6,567,823 B1 | * | 5/2003 | Rothschild | 1/1 |
| 6,915,315 B2 | * | 7/2005 | Autrey et al. | 1/1 |
| 7,756,818 B1 | * | 7/2010 | Parker | 1/1 |
| 8,103,704 B2 | * | 1/2012 | Abrams | 707/809 |
| 8,150,811 B1 | * | 4/2012 | Tarenskeen et al. | 707/659 |
| 2003/0220935 A1 | * | 11/2003 | Vivian et al. | 707/102 |
| 2004/0107226 A1 | * | 6/2004 | Autrey et al. | 707/204 |
| 2004/0122865 A1 | * | 6/2004 | Stahl et al. | 707/104.1 |
| 2004/0220981 A1 | * | 11/2004 | Taylor | 707/204 |
| 2004/0260726 A1 | * | 12/2004 | Hrle et al. | 707/104.1 |
| 2005/0138081 A1 | * | 6/2005 | Alshab et al. | 707/200 |
| 2005/0138087 A1 | * | 6/2005 | Beck et al. | 707/204 |
| 2006/0184561 A1 | * | 8/2006 | Terada | 707/102 |
| 2006/0212493 A1 | * | 9/2006 | Aronoff et al. | 707/202 |
| 2006/0236049 A1 | * | 10/2006 | Iwamura | 711/162 |

(Continued)

FOREIGN PATENT DOCUMENTS

WO    WO 01/04797    *    1/2001

*Primary Examiner* — Srirama Channavajjala
(74) *Attorney, Agent, or Firm* — Randy L. Campbell, Jr.

(57) ABSTRACT

A method of archiving a set of source tables in a database system. Each source table has a plurality of rows. Initially, a consistency point for the set of source tables is established. The database system creates a log record for each change (insert, modify, or delete) effected to a row of the source tables subsequent to the consistency point. Substantially all source table rows are copied to an archive (a data storage object that is external to the database system). Then the accumulated log records for the affected source tables are distilled and appended to the archive.

14 Claims, 5 Drawing Sheets

U.S. PATENT DOCUMENTS

2006/0242370 A1* 10/2006 Suzuki et al. .................. 711/162
2007/0055687 A1* 3/2007 Josten et al. .................. 707/102
2008/0294697 A1* 11/2008 Andrasak et al. ............. 707/200
2009/0083341 A1* 3/2009 Parees et al. .................. 707/204

* cited by examiner

ARCHIVING METHOD AND SYSTEM

CROSS REFERENCE TO RELATED APPLICATIONS

This application claims priority under 35 U.S.C. §119(e) to the following co-pending and commonly-assigned patent application, which is incorporated herein by reference:

Provisional Application Ser. No. 61/012,959, entitled "ARCHIVING METHOD AND SYSTEM," filed on Dec. 12, 2007.

BACKGROUND

Described below is a technique for handling the restore and archive process on an on-line archive. An on-line archive is a process in which database objects, for example database tables, are archived while allowing the objects to be updated.

It is desirable that a given archive operation within a database system be associated with a single consistency point. A consistency point can be thought of as a certain point in time such that all changes that committed prior to that point, and only those changes, are visible. All "visible" states of a database are consistent. The transition from one consistent state to another may entail multiple update actions but the intermediate states are only visible within the updating transaction. Only the final state becomes visible when the updating transaction terminates successfully. If the updating transaction does not complete successfully then all changes are automatically voided.

Database systems employ various methods to prevent the exposure of transitional states. All such methods are variants of two basic approaches, namely locking and versioning. In a locking system, transactions must request permission from a lock manager to read or update specific data objects. When a lock is granted, it is held by the transaction until it terminates. The lock manager will delay granting a lock while a conflicting lock is held by another transaction. One disadvantage of locking is that transaction delays due to lock conflicts may be excessive under certain conditions.

In a versioning system, multiple versions of an object are maintained. Alternatively, at least information sufficient to reconstruct an earlier version is preserved and linked to the new version. Only one version of the object, which is not necessarily the latest version, is visible to a given transaction. With a versioning system, a transaction is never delayed due to a conflicting update. Instead the transaction is given immediate access to some earlier version of the object. Disadvantages of versioning systems include the fact that they require more storage space to maintain multiple versions of objects, additional information must be maintained for each object so that the system can select the correct version and also determine when a version becomes completely obsolete and available for physical removal, and also queries may incur additional processing overhead to filter out unwanted versions of objects.

The method described here combines elements of the locking and versioning techniques in a novel way.

SUMMARY

A method of archiving a set of source tables in a database system is described. Each source table has a plurality of rows. Initially, a consistency point for the set of source tables is established. The database system creates a log record for each change (insert, modify, or delete) effected to a row of the source tables subsequent to the consistency point. Substantially all source table rows are copied to an archive (a data storage object that is external to the database system). Then the accumulated log records for the affected source tables are distilled and appended to the archive.

Also described below is a method of restoring a target table in a database system from an archive. For each target table, the archive has a plurality of base rows and a set (possibly empty) of log records. Substantially all base rows are copied from the archive to the target table. Substantially all related log records are retrieved from the archive. The target table is then modified by reversing the insert, update, or delete actions indicated by the log records.

DETAILED DESCRIPTION

Figure 1:
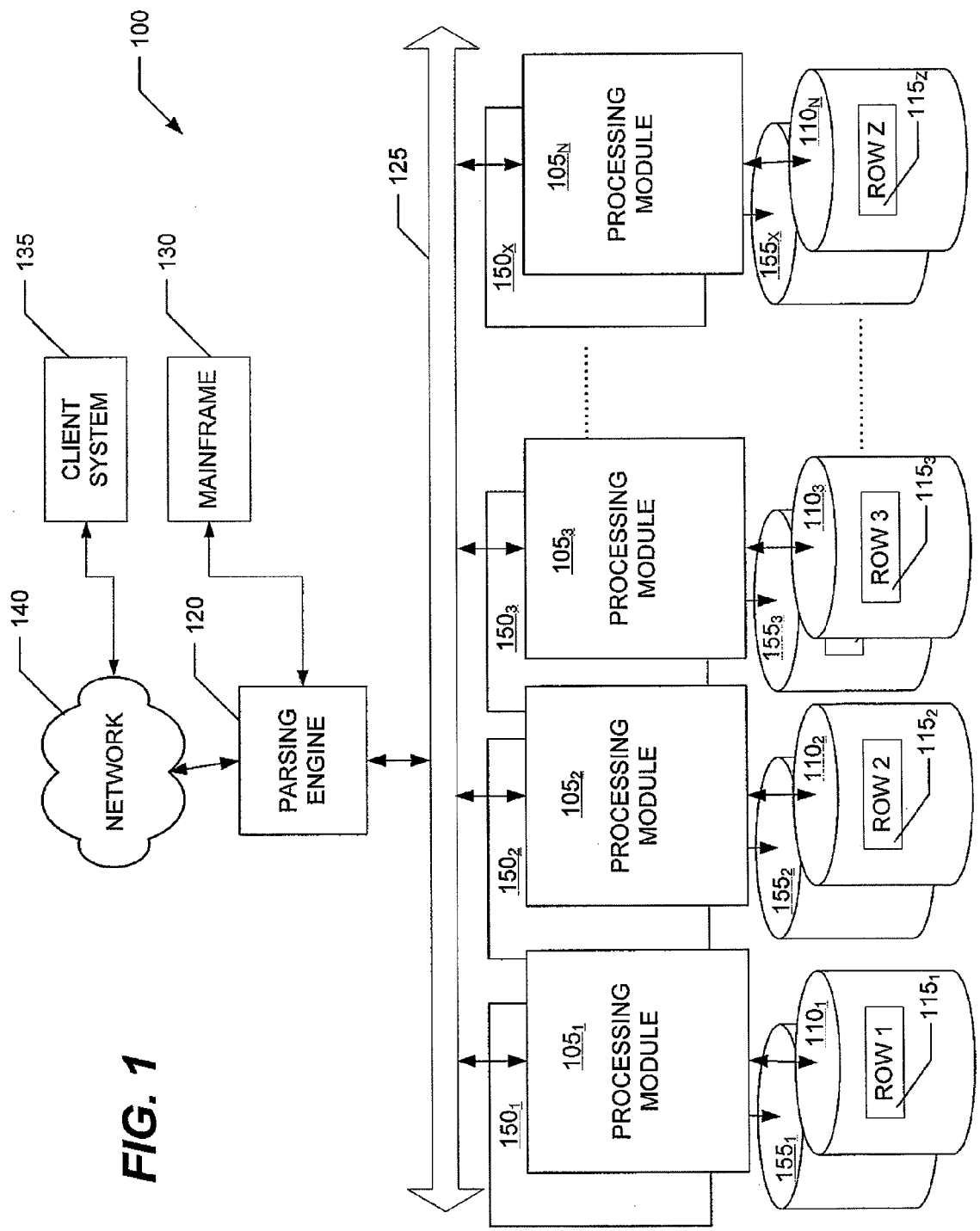
FIG. 1 is a block diagram of an exemplary large computer system in which the techniques described below are implemented.

FIG. 1 shows an example of a database system 100, such as a Teradata active data warehousing system available from Teradata Corporation. Database system 100 is an example of one type of computer system in which the techniques of handling a restore and archive process for an on-line archive are implemented. In computer system 100, vast amounts of data are stored on many disk-storage facilities that are managed by many processing units. In this example, the data warehouse 100 includes a relational database management system (RDBMS) built upon a massively parallel processing (MPP) platform.

Other types of database systems, such as object-relational database management systems (ORDMS) or those built on symmetric multi-processing (SMP) platforms are also suited for use here.

The data warehouse 100 includes one or more processing modules $105_{1 \ldots N}$ that manage the storage and retrieval of data in data-storage facilities $110_{1 \ldots N}$. The rows $115_{1 \ldots Z}$ of the tables are stored across multiple data-storage facilities $110_{1 \ldots N}$ to ensure that the system workload is distributed evenly across the processing modules $105_{1 \ldots N}$. A parsing engine 120 organizes the storage of data and the distribution of table rows $115_{1 \ldots Z}$ among the processing modules $105_{1 \ldots N}$. The parsing engine 120 also coordinates the retrieval of data from the data-storage facilities $110_{1 \ldots N}$ over network 125 in response to queries received from a user at a mainframe 130 or a client computer 135 connected to a network 140. The database system 100 usually receives queries and commands to build tables in a standard format, such as SQL.

In one implementation the rows $115_{1 \ldots Z}$ are distributed across the data-storage facilities $110_{1 \ldots N}$ by the parsing engine 120 in accordance with their primary index. The primary index defines the columns of the rows that are used for calculating a hash value. The function that produces the hash value from the values in the columns specified by a primary index (in Teradata terminology) is called a hash function.

It is often necessary to archive rows 115 of the table. In the case of hardware failure a database system manager needs to remove the faulty hardware, replace the hardware and restore the data onto the new hardware from the latest archived copy.

It is also helpful for a database developer to conduct testing on data for various reasons. It is helpful to have an archive of the table data so that any changes arising from the testing in the main or primary copy of the data can be restored by the archived copy, or alternatively a complete copy of the archived copy can be made and testing performed on that copy of the archived copy.

Shown in FIG. 1 is a further set of processing modules $150_{1...X}$. Processing modules $150_{1...X}$ manage the storage and retrieval of data in data-storage facilities $155_{1...X}$. It is data-storage facilities $155_{...X}$ on which the on-line archive of table rows $115_{1...Z}$ is stored.

Figure 2:
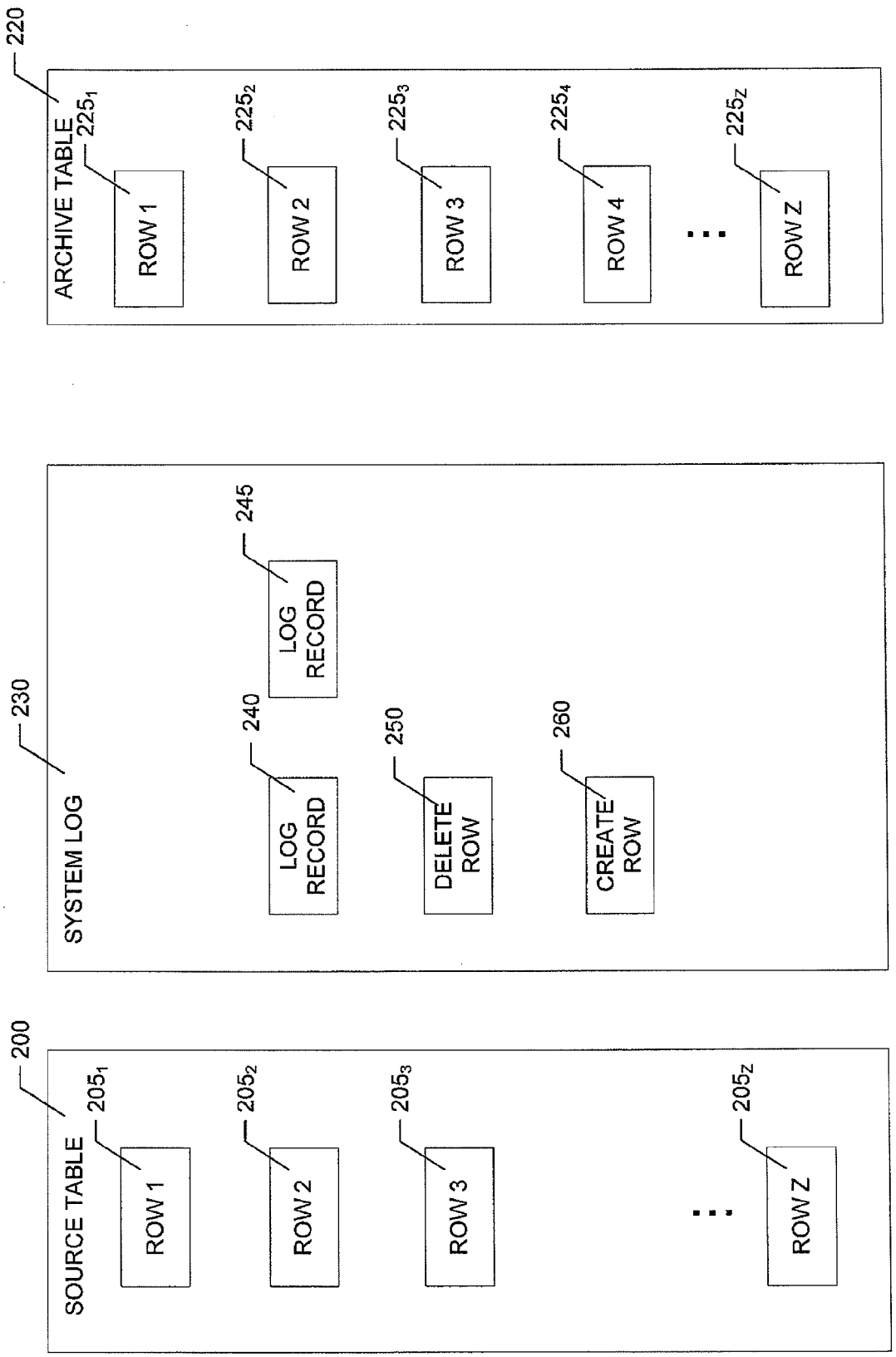
FIG. 2 is a diagrammatic representation of a preferred form archive process.

FIG. 2 illustrates one technique for implementing an on-line archive process. A source table 200 includes base rows $205_{1...Z}$. As part of the archive process, a consistency point is established. A table read lock is placed on source table 200 to establish the consistency point. Once the consistency point is established substantially all of the base rows $205_{1...Z}$ are copied to archive table 220. Archive table 220 includes base rows $225_{1...Z}$. All base rows $205_{1...Z}$ are copied to base rows $225_{1...Z}$.

While the table read lock is in place a private system log 230 is initialized for the table. The read lock is released and the table is again available for regular updating transactions. Any change after the consistency point is recorded in private log 230. Changes include change to an existing row, deletion of a row, or creation of a new row.

In the techniques described below, an on-line archive does not restrict or only minimally restricts updates, deletions, additions and other operations on base rows $205_{1...Z}$. Updates or changes result in a new log record for each change. The system log is maintained in chronological order so that the order of changes to a base row can be determined.

In the situation shown in FIG. 2, no changes are made to row $205_1$. No entries are made in system log 230. The corresponding entry row $225_1$ in archive table 220 is the same.

Row 2 indicated at $205_2$ in FIG. 2 has two subsequent updates made to it. The updates are stored as log record 240 and log record 245 in system log 230.

Row 3 indicated at $205_3$ in source table 200 is deleted following the consistency point. Deletion of the row is stored in system log 230 as indicated at 250.

Row 4 does not exist in source table 200 at the consistency point. It is created after the consistency point. It therefore appears in the system log 230 as indicated at 260 and also in archive table 220, as shown at $225_4$.

The copying of rows from the source table 200 to the archive table 220 commences at any 20 time after the consistency point has been established. System log 230 is copied to archive table 220 after all of the regular rows $205_{1...Z}$ have been copied. The logging activity on system log 230 is then stopped and the system log 230 removed from the system. The operation to stop and remove system log 230 does not require any kind of lock on source table 200.

Figure 3A:
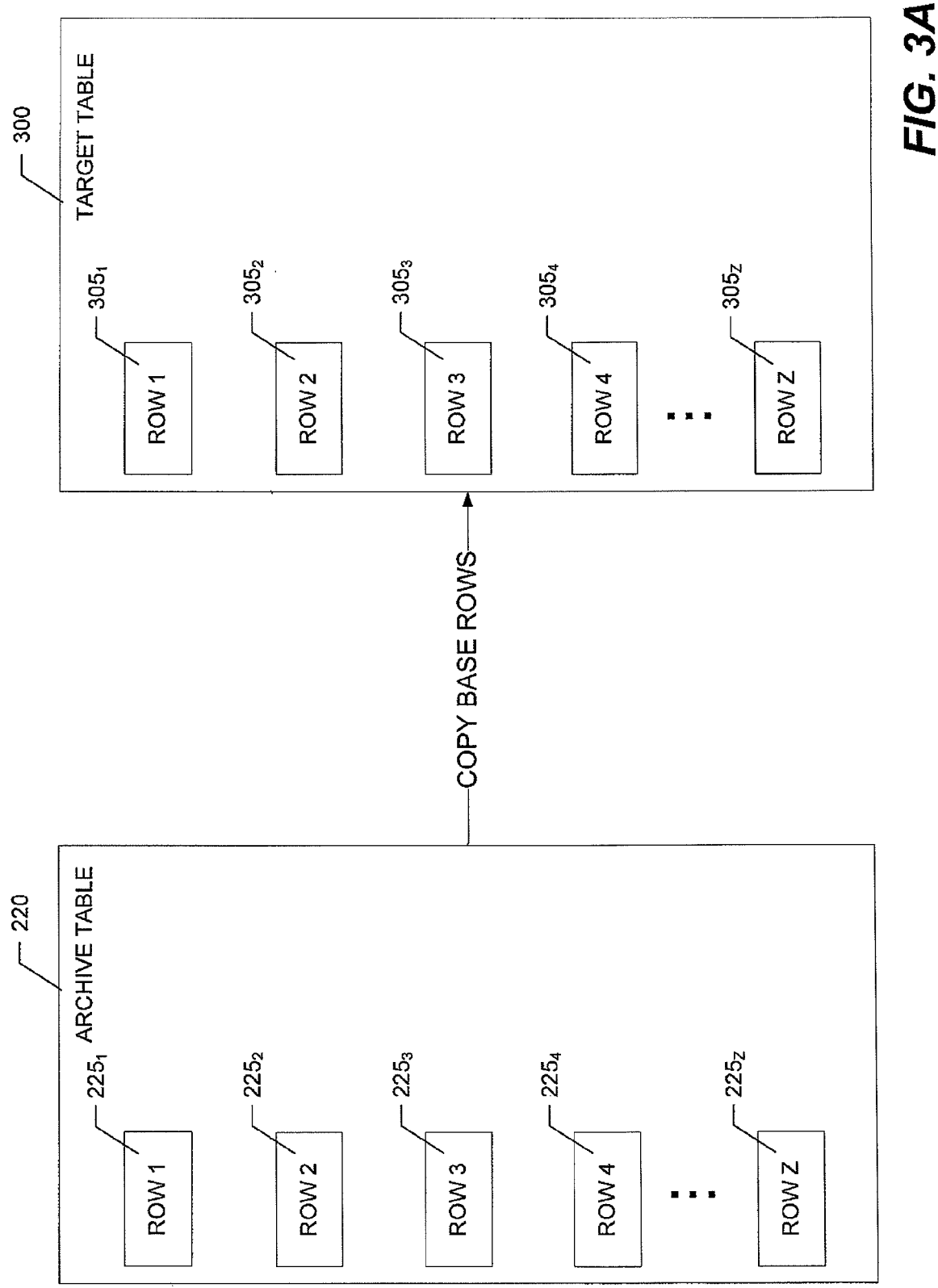
FIGS. 3A and 3B illustrate the process of restoring a table from the on-line archive shown in FIG. 2.
Figure 3B:
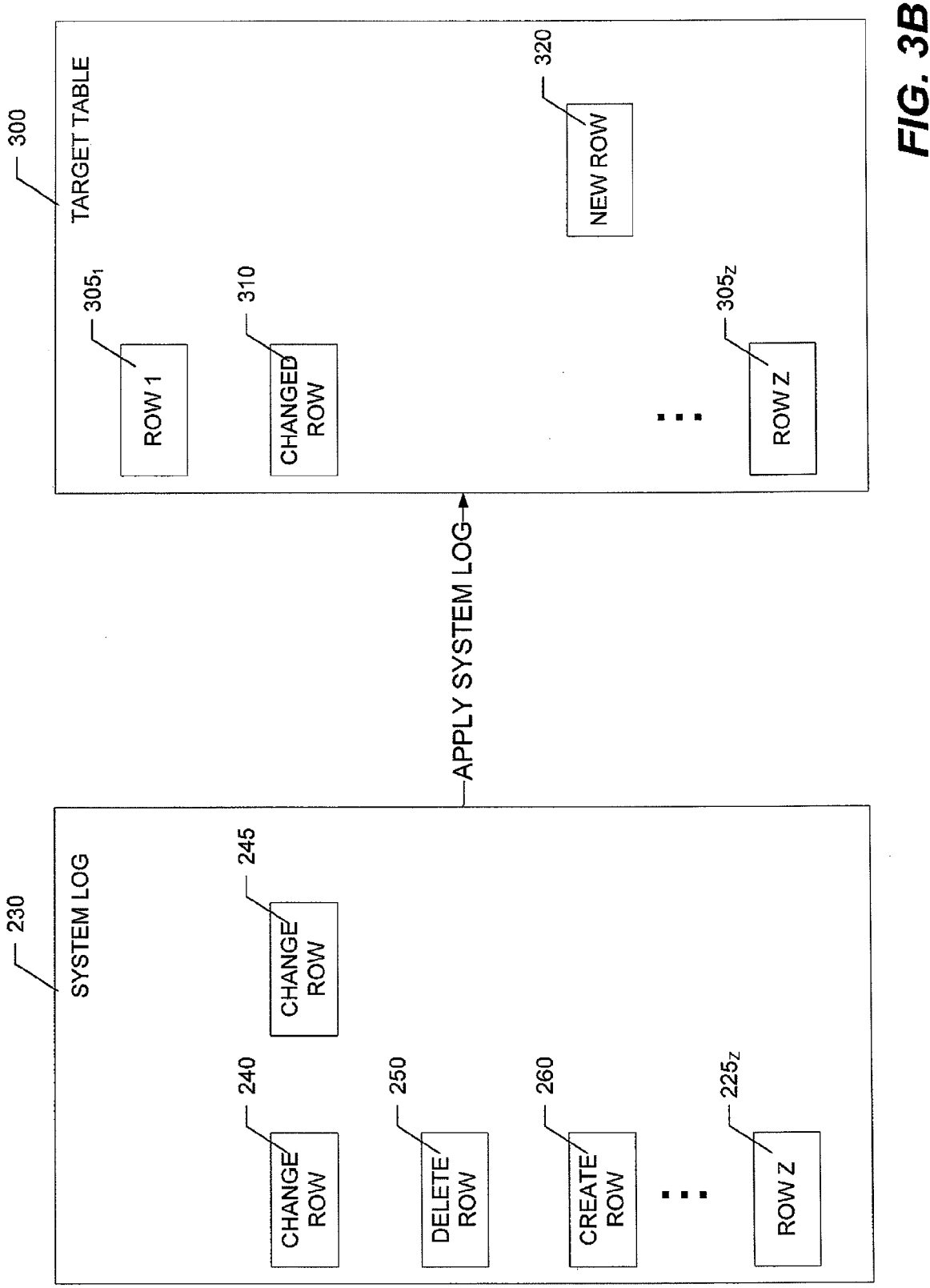

FIGS. 3A and 3B illustrate the process of restoring a table from the on-line archive of FIG. 2. As shown in FIG. 3A, base rows $225_{1...Z}$ are first copied from archive table 220 to target table 300. This results in base rows $305_{1...Z}$ in target table 300.

As shown in FIG. 3B, all changes, deletions and creations from system log 230 are applied to the rows $305_{1...Z}$ of target table 300. The data from the system log 230 are used to roll back the changes that occurred after the consistency point. There are two log records in system log 230, namely rows 240 and 245. Row 240 replaces row $305_2$ in target table 300 as shown at 310, but row 245 is ignored because it reflects a later change. Row $305_3$ is deleted from target table 300 due to the application of log record 260. Row 320 is inserted into target table 300 due to the application of log record 250. The remaining rows in target table 300 remain unchanged. Resulting table 300 is a table restored from archive table 220. It is identical to source table 200 prior to archiving.

Figure 4:
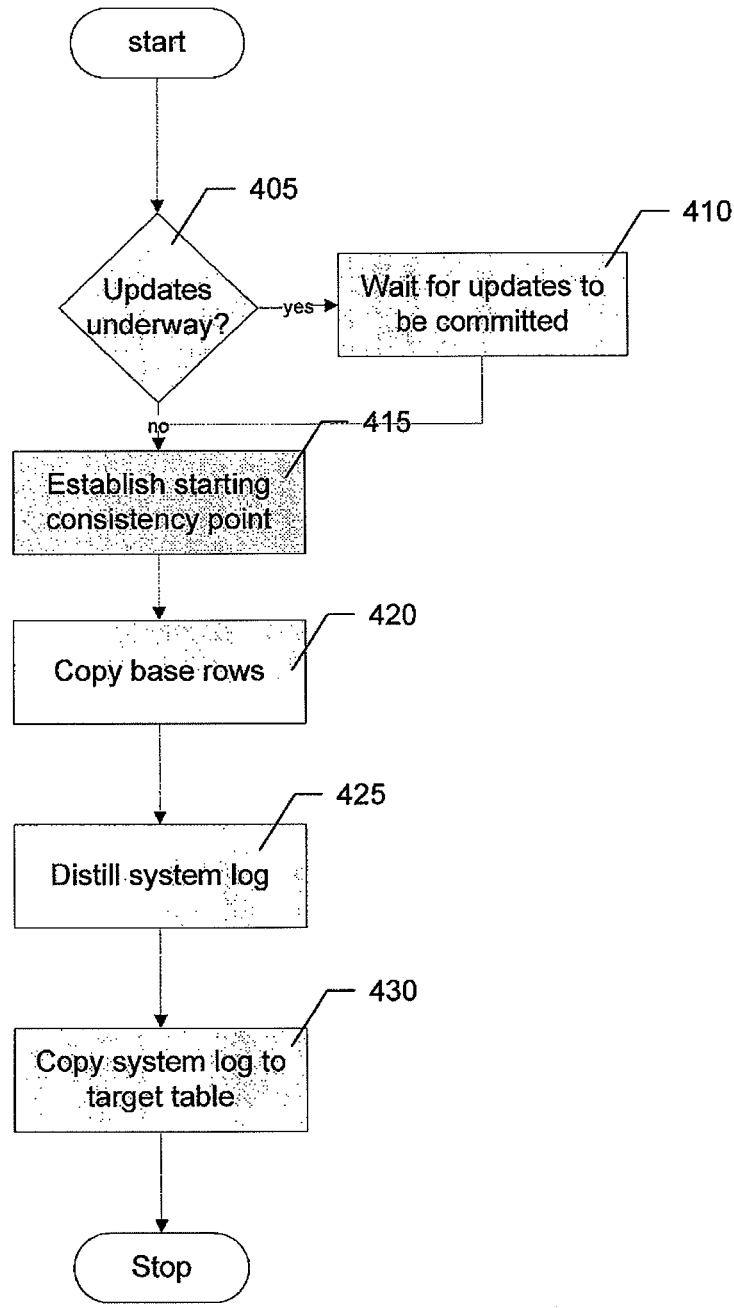
FIG. 4 is a flow chart of a preferred form archive process.

FIG. 4 shows a flowchart of a preferred form process. If there are updates underway 405 at a given point then the updates are committed 410. Once the updates are committed the consistency point 415 is established. There are no outstanding uncommitted updates at the consistency point. All base rows are copied 420 from the source table to the archive table.

The system log is distilled 425 by eliminating multiple log records for the same row. The system log is copied 430 to the target table.

A "weak" table level lock is optionally placed on source table 200 during the archiving process. The weak lock allows all DML operations including reading, inserting, updating and deleting rows, but it prevents certain DDL operations such as those that create new indices for a table or otherwise change the structure of the table. Some DDL operations such as collecting statistics are permitted. Alternatively no lock is placed on the source table 200.

In a database in which it is necessary to archive ten different tables all at a consistent point, it is often necessary to wait for individual tables to be out of any update transactions so that locks can be placed on the tables to establish a consistency point. The techniques described here enable changes to rows that occur during the archiving process. These changes are stored in the archived table for subsequent retrieval.

As described above, only one log record for each base row is stored in the archive table. This means that the log records do not have any order requirement, so that the changes do not need to be stored in chronological order.

The techniques described above enable changes to be made to the table rows during the archive process.

The log records do not need to be merged into a single data set or single log. This enables the log records to be handled in parallel and reduces the requirement for a single point tape drive or file that would limit the performance on a large system such as that shown in FIG. 1.

The restore time for an on-line archive such as that described above is up to and usually less than two times longer than a full read lock dump. This is because in the worst case scenario there is a base row and a corresponding log record in the archive table. Prior techniques involving permanent journals have the potential to be slower.

The text above describes one or more specific embodiments of a broader invention. The invention also is carried out in a variety of alternative embodiments and thus is not limited to those described here. Those other embodiments are also within the scope of the following claims.

We claim:

1. A method of archiving a source table in a database system, the source table having a plurality of base rows, the method comprising the steps of:

establishing, with a processor, a starting consistency point for the source table, wherein the starting consistency point is a starting point in time of an archive process;

after the starting consistency point, copying, with the processor, substantially all base rows from the source table to an archive table;

permitting, with the processor, the source table to have more than one change effected to each respective base row during the archive process;

creating, with the processor, a log record for each respective change effected to a base row of the source table after the starting consistency point; and copying, with the processor, at least some of the log records from the source table to the archive table that were created after the starting consistency point such that the resulting archive table includes a plurality of base rows and the at least some of the log records, wherein the copying of the at least some of the log records is limited to copying no more than one log record for each base row having more than one respective change, and wherein completion of the copying of the at least some of the log records defines an end of the archive process.

2. The method of claim 1 further comprising the step, if there is more than one log record for a base row, of selecting for copying, with the processor, only the earliest log record.

3. A method of restoring a target table in a database system from an archive table, the archive table having a plurality of base rows and no more than one log record for each base row, the method comprising the steps of:

copying, with a processor, substantially all base rows from the archive table to the target table;

retrieving, with the processor, substantially all log records from the archive table; and replacing, with the processor, those base rows in the target table that have a corresponding log record with the log record.

4. The method of claim 1 further comprising:

selecting, with the processor, a subset of operations configured to be performed on the source table, wherein the subset of operations is less than all available operations configured to be performed on the source table; and preventing, with the processor, performance of the subset of operations on the source table during the archive process.

5. The method of claim 4 further comprising allowing, with the processor, performance of operations configured to be performed on the source table included in the all available operations and not included in the subset of operations during the archive process.

6. The method of claim 1, wherein the copying, with the processor, the substantially all base rows comprises copying in parallel, with the processor, the substantially all base rows from the source table to the archive table.

7. The method of claim 3, wherein the replacing, with the processor, those base rows comprises replacing in parallel, with the processor, those base rows in the target table that have a corresponding log record with the log record.

8. A database system comprising:

a memory device configured to store a database having a source table, wherein the source table includes a plurality of base rows;

a processor configured to:

retrieve the source table from the memory device;

establish a starting consistency point for the source table;

generate an archive table;

copy substantially all base rows from the source table to the archive table;

permit the source table to have more than one change effected to each respective base row after the starting consistency point;

create a log record for each respective change effected to a base row of the source table; and copy at least some of the log records from the source table to the archive table that were created after the starting consistency point such that the resulting archive table includes a plurality of base rows and the at least some of the log records, wherein no more than one log record is copied from the source table to the archive table for each base row that has more than one corresponding log record.

9. The database system of claim 8, wherein the processor is further configured to, if there is more than one log record for a base row, select only the earliest log record to copy for the base row.

10. The database system of claim 8, wherein the processor is further configured to:

copy substantially all base rows from the archive table to a target table included in the database;

retrieve the at least some log records from the archive table; and replace those base rows in the target table that have a corresponding log record in the at least some log records with the log record.

11. The database system of claim 8, wherein the processor is further configured to:

select a subset of operations configured to be performed on the source table after the starting consistency point, wherein the subset of operations is less than all available operations configured to be performed on the source table; and prevent performance of the subset of operations on the source table after the starting consistency point.

12. The database system of claim 11, wherein the processor is further configured to allow performance of operations configured to be performed on the source table after the starting consistency point.

13. The database system of claim 8, wherein the processor is further configured to copy in parallel the substantially all base rows from the source table to the archive table.

14. The database system of claim 8, wherein the processor is further configured to replace, in parallel, those base rows in the target table that have a corresponding log record with the log record.

* * * * *